US007403915B2

United States Patent
Bundy et al.

(10) Patent No.: US 7,403,915 B2
(45) Date of Patent: Jul. 22, 2008

(54) AUCTION SYSTEM AND METHOD (75) Inventors: Reza S. Bundy, Cambridge, MA (US); Jeffrey Barca-Hall, Santa Cruz, CA (US); William Coleman, San Jose, CA (US); Dylan Ragozin, Portola Valley, CA (US); Ping Li, San Francisco, CA (US); Madhu Vudali, Santa Clara, CA (US)

(73) Assignee: Iron Planet, Palo Alto, CA (US)

( * ) Notice: Subject to any disclaimer, the term of this patent is extended or adjusted under 35 U.S.C. 154(b) by 33 days.

(21) Appl. No.: 09/832,513

(22) Filed: Apr. 10, 2001

(65) Prior Publication Data

US 2002/0013761 A1 Jan. 31, 2002

Related U.S. Application Data (60) Provisional application No. 60/196,062, filed on Apr. 10, 2000.

(51) Int. Cl.
*G06Q 40/00* (2006.01)
(52) U.S. Cl. ...................................................... 705/27
(58) Field of Classification Search .................. 705/26, 705/27
See application file for complete search history.

(56) References Cited

U.S. PATENT DOCUMENTS 5,835,896 A * 11/1998 Fisher et al. .................. 705/37
5,845,265 A * 12/1998 Woolston ..................... 705/37
5,890,138 A *  3/1999 Godin et al. .................. 705/26
6,055,514 A    4/2000 Wren
6,108,639 A *  8/2000 Walker et al. ................ 705/26
6,243,691 B1   6/2001 Fisher et al.
6,847,939 B1 *  1/2005 Shemesh ..................... 705/26

OTHER PUBLICATIONS

"Microsoft Computer Dictionary", 1999, Microsoft Press, 4th.Edition, p. 425.*

(Continued)

*Primary Examiner*—Jim Trammell
*Assistant Examiner*—Hai Tran
(74) *Attorney, Agent, or Firm*—Townsend and Townsend and Crew, LLP (57) ABSTRACT An auction system 200 in a networked environment. The system includes a preregistration module 201 for identifying and verifying a user of the auction system. The preregistration module checks the credit history of the user and generates a registration record of the user. The system includes an assurance module 210 for conducting a presale inspection of the merchandise item and to generate a merchandise inspection report. The system also includes a description module 215 for displaying the merchandise inspection report and a description report of the merchandise item. The system includes a bidding module 220 for processing a plurality of bids from a plurality of users. The bidding module analyzes each of the plurality of bids from each of the plurality of users to determine whether an incoming bid is higher or lower than a current high bid and to determine a current high bid. The system further includes a notification module 250 coupled to a system database for assigning each of the plurality of bids with each of the plurality of users and that notifies each of the plurality of users whether their bid is successful.

23 Claims, 8 Drawing Sheets

OTHER PUBLICATIONS www.ebay.com—help pages "Frequently Asked Questions on Selling", available on the Internet Nov. 22, 1999.*

News article from Dialogdatabase Website. "Mondera.com Established Standards of Quality and Consistency in Jewelry Industry", dated Oct. 21, 1999.*

"Dictionary of Business Terms", by Jack P. Friedman, Third Edition, 2000, p. 741.*

PCT—Notification of Transmittal of The International Search Report or the Declaration.

Press Release from constructionTradeYard.com dated Sep. 27, 2000.

IronPlanet Corporate Information printed from http://222.ironplanet.com/aboutus/pr_3-8-00.

* cited by examiner

AUCTION SYSTEM AND METHOD

CROSS-REFERENCES TO RELATED APPLICATIONS

This application claims priority to U.S. application Ser. No. 60/196,062, filed Apr. 10, 2000, which is incorporated herein by reference for all purposes.

BACKGROUND OF THE INVENTION

Traditional, non-Internet auction processes for heavy equipment typically involve a four-step process. First, the potential bidder travels to the auction site. Next, the potential bidder inspects the items to be auctioned. In most cases, the bidder personally inspects the item or finds and hires a qualified inspector. Once the item's condition is determined, the bidder develops a bidding strategy. Finally, the potential bidder physically bids at the auction site in hopes of buying the item below the assessed price. The potential bidder's total expense for the item includes the time invested; travel to and lodging at the auction site; the cost of the inspector; the price paid for the item; and, equipment transportation cost from the auction site to the bidder's desired location.

The seller's process and costs in the pre-Internet traditional auction process are similar. The seller normally has equipment inspected to find major deficiencies and items that should be fixed prior to sale. The bidder hopes that the seller has the proper ethics to properly fix items and not conceal any deficiencies. Potential bidders like to see the seller's technical inspection, but the seller rarely provides this inspection to the bidder. The seller's total expense includes the time invested; travel to and lodging at the auction site; transportation for the item to the action site; initial inspection and preparation of the equipment; and, the risk that the equipment is not sold.

In general, Internet auctions increase product exposure and increase the bidding pool. A bidder in Japan for example, can bid on an item in Texas against a bidder in New Jersey. This process works satisfactory for small dollar items or new items procured from the manufacturer. Used items, particularly, expensive items such as used heavy equipment, motor vehicles, and the like, add significant risk to the bidder because the seller establishes the item's description and condition.

The advantages of going to a traditional Internet auction site must be weighed against the risk that the inspection process is eliminated. Internet auction sites attempt to deal with this problem by providing past sales experiences and comments from previous buyers on the seller, or holding the transaction funds in escrow until the buyer is satisfied. Internet auction sites do not offer inspections or assurances to bidders on the equipment offered on their sites. This risk naturally affects the bid price, which results in selling items at lower prices for the seller and a higher degree of dissatisfaction with potentially misrepresented equipment condition.

The purpose of Internet auctions is to provide better markets, better prices, reduced costs (travel to sites), and in general, a more satisfactory and cost effective way to conduct auction business. However, the lack of an impartial third party inspection system to provide quality control to the auction process hinders the full potential of the Internet auction. What is needed in the art is an efficient Internet auction market with an impartial third party inspection system. The present invention fulfills this and other needs.

SUMMARY OF THE INVENTION

The present invention provides an auction system and method in a networked environment. Advantageously, the system provides an independent, impartial third party for inspection of the auctioned merchandise item. As such, the present invention provides an auction system for a merchandise item in a networked environment, comprising at least one client connected to at least one server by a network. The system includes a preregistration module coupled to the at least one server for identifying and verifying a user of the auction system. The preregistration module checks the credit history of the user and generates a registration record of the user.

Advantageously, the system of the present invention includes an assurance module coupled to the preregistration module for conducting a presale inspection of the merchandise item and to generate a merchandise inspection report. Preferably, the merchandise item is a heavy equipment item, such as asphalt equipment, agricultural equipment, cranes, dozers, and the like. The system also includes a description module coupled to the assurance module for displaying the merchandise inspection report and a description report of the merchandise item. The system includes a bidding module that is coupled to the description module for processing a plurality of bids from a plurality of users. The bidding module analyzes each of the plurality of bids from each of the plurality of users to determine whether an incoming bid is higher or lower than a current high bid and to determine a current high bid. The auction system of the present invention also includes a system database coupled to the at least one server for storing each of the plurality of bids from each of the plurality of users, the merchandise inspection report, the description report and the registration report. The system further includes a notification module coupled to the system database for assigning each of the plurality of bids with each of the plurality of users and notifies each of the plurality of users whether their bid is successful.

In another embodiment, the present invention provides a method for auctioning a merchandise item in a networked environment comprising at least one client connected to at least one server by a network. The method comprising imputing preregistration material from the client into a system database to generate a registration record of a user. The method includes inspecting the merchandise item to generate a merchandise inspection report. The method includes describing the merchandise item to generate a description report. The method includes browsing said inspection report and the description report to allow the user to select the merchandise item and make a bid. The method includes processing a plurality of bids from a plurality of users, and analyzing each of the plurality of bids from each of the plurality of users to determine whether an incoming bid is higher or lower than a current high bid and to determine a current high bid. The also method includes storing each of the plurality of bids from each of the plurality of users, the merchandise inspection report, the description report and the registration report in the system database; and correlating each of said plurality of bids with each of said plurality of users and notifying each of the plurality of users whether their bid is successful, thereby auctioning the merchandise item in a networked environment.

The present system and method offers many advantages over conventional systems. The present system eliminates the need for holding the transaction funds in escrow until the buyer is satisfied, as the buyer can depend on the impartial assurance report. Sellers obtain higher sale prices as dissatisfaction with potentially misrepresented equipment is eliminated. Impartial third party reviewers provide quality control to the auction process and facilitate the Internet auction marketing business process.

These and other advantages, objects and embodiments of the present invention, will be described in more detail in conjunction with the following figures and the detailed description.

DETAILED DESCRIPTION OF THE INVENTION AND PREFERRED EMBODIMENTS

In general, the present invention is preferably practiced within a client/server-programming and system environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

Many business applications being written today use the client/server model as does the Internet's main protocol, HTTP. Typically, multiple client programs share the services of a common server program. Both client programs and server programs are often part of a larger program or application. Relative to the Internet, a Web browser is a client program that requests services (the sending of Web pages or files) from a Web server (e.g. XML, or HTTP server) in another computer somewhere on the Internet. Similarly, a computer with TCP/IP installed allows client requests for files from File Transfer Protocol (FTP) servers in other computers on the Internet.

Moreover, client/server environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or an Extranet, as well. The term "computer network" shall incorporate publicly accessible computer networks and private computer networks.

Figure 1:
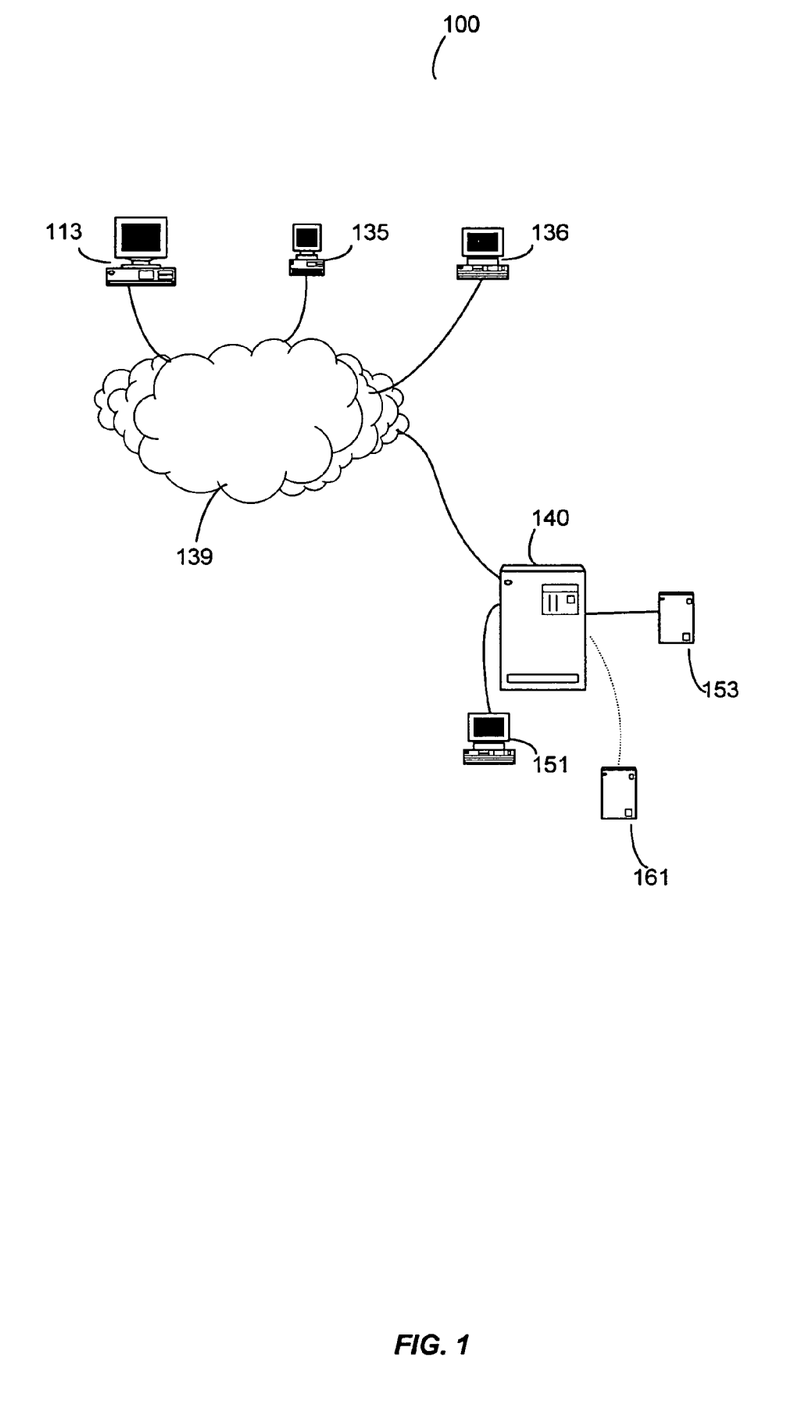
FIG. 1 illustrates a representative networked environment for embodying the present invention.

FIG. 1 illustrates a client/server computing system 100 in which the present invention may be embodied. In the illustrated system, remote user computers 113, 135, 136 have a client application resident thereon and a host computer 140 has a server application resident thereon. The user computers 113, 135, 136 include a communications link for communicating with the host computer 140. The communications link may be established via a modem connected to traditional phone lines, an ISDN link, a T1 link, a T3 link, via cable television, via an ethernet network, and the like. The modem may also be a wireless modem configured to communicate with the modem of the host computer 140 via wireless communications systems. The communications link also may be made by a direct connection of the user computers 113, 135, 136 to the host computer 140 or indirectly via a computer network, such as the Internet 139, in communication with the host computer 140. Preferably, the communication link between the user computers 113, 135, 136 and the host computer 140 is via the Internet 139.

Preferably, users computers 113, 135, 136 haven Intel Pentium® processors (or equivalent) with at least thirty-two megabytes (32 MB) of RAM, and at least five megabytes (5 MB) of persistent computer storage for caching. However, it is to be understood that various processors may be utilized to carry out the present invention without being limited to those enumerated herein. Although a color display is preferable, a black and white display or standard broadcast or cable television monitor may be used. Exemplary user computers having a client application resident thereon may include, but are not limited to, an Apple®, Sun Microsystems®, IBM®, or IBM®-compatible personal computer. A user computer, if an IBM®, or IBM®-compatible personal computer, preferably utilizes either a Windows®, Unix®, Linux® or OS/2® operating system.

A host computer 140 may have a configuration similar to that of users computers 113, 135, 136 and may include a central processing unit, a display, a pointing device, a keyboard, access to persistent data storage, and a communications link for connecting to the users computers 113, 135, 136 via a modem or otherwise.

It is understood that a user's computer having a client application resident thereon or a host computer having a server application resident thereon or other apparatus configured to execute program code embodied within computer usable media, may operate as means for performing the various functions and carries out the methods of the various operations of the present invention.

The host computer 140 comprises various databases 153, 161. The databases may be relational databases, distributed databases, or object-oriented databases or mixed object oriented databases. Exemplary database products with which the present invention may be implemented include, but are not limited to, IBM's DB2, Microsoft's Access and FoxPro, and database products from Oracle, Sybase, and Computer Associates.

Each of the user computers 113, 135, 136 can be owned and operated by a different individual. Consumer computers can be configured with many different hardware components and can be made in many dimensions, styles and locations (e.g., laptop, palmtop, pentop, server, workstation and mainframe). For example, computer 113 can be at the home of a first individual, individual computer 135 can be at the home of a second individual, and consumer computer 136 can owned by a third individual, etc. Consumer computer e.g., 113 can include, as one example, conventional desktop personal computers or workstations having the ability to connect to network 139 and being capable of running customized software supporting the service provided by the present invention.

Terminal 151 is connected to server 140. This connection can be by a network such as Ethernet, asynchronous transfer mode, IEEE standard 1553 bus, modem connection, universal serial bus, etc. The communication link need not be a wire but can be infrared, radio wave transmission, etc. Server 140 such as for the hub site, is coupled to the Internet 139. The Internet is shown symbolically as a cloud or a collection of server routers 139. The connection to server 140 to the Internet is typically by a relatively high bandwidth transmission medium such as a T1 or T3 line.

Internet server 140 and databases 153, 161 store information and disseminate it to individual computers 113, 135, 136 over wide area network 139. Server 140 connected to wide area network 139 stores WebPages on an electronic database 153. The present invention provides an auction system and method for a merchandise item in a networked environment, wherein the networked environment comprises at least one client connected to at least one server by a network. The concepts of "client" and "server," as used in this application and the industry, are very loosely defined and, in fact, are not fixed with respect to machines or software processes executing on the machines. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a WEB site is often hosted by a server computer with a large storage capacity, high-speed processor and Internet link having the ability to handle many high-bandwidth communication lines.

With respect to the electronic databases 153, 161, they generally contain WebPages, inspection reports, description reports, credit reports, questionnaires, and forms. The databases 153, 161 can be composed of a number of different databases. These databases can be located in one central repository, or alternatively, they can be dispersed among various distinct physical locations. These databases can be categorized and structured in various ways based on the needs and criteria of the database designer. Methods used to create and organize databases are commonly known in the art, for example, relational database techniques can be used to logically connect these databases. These databases can be physically located separate from the processor. These databases can reside on remote, distant servers on a local area network or the Internet. Under this arrangement, whenever any data are needed, the processor needs to access the necessary database(s) via a communication channel to retrieve the requisite data for analysis. For example, the processor can access and retrieve data from a remote database via a computer network such as a LAN or the Internet.

Figure 2:
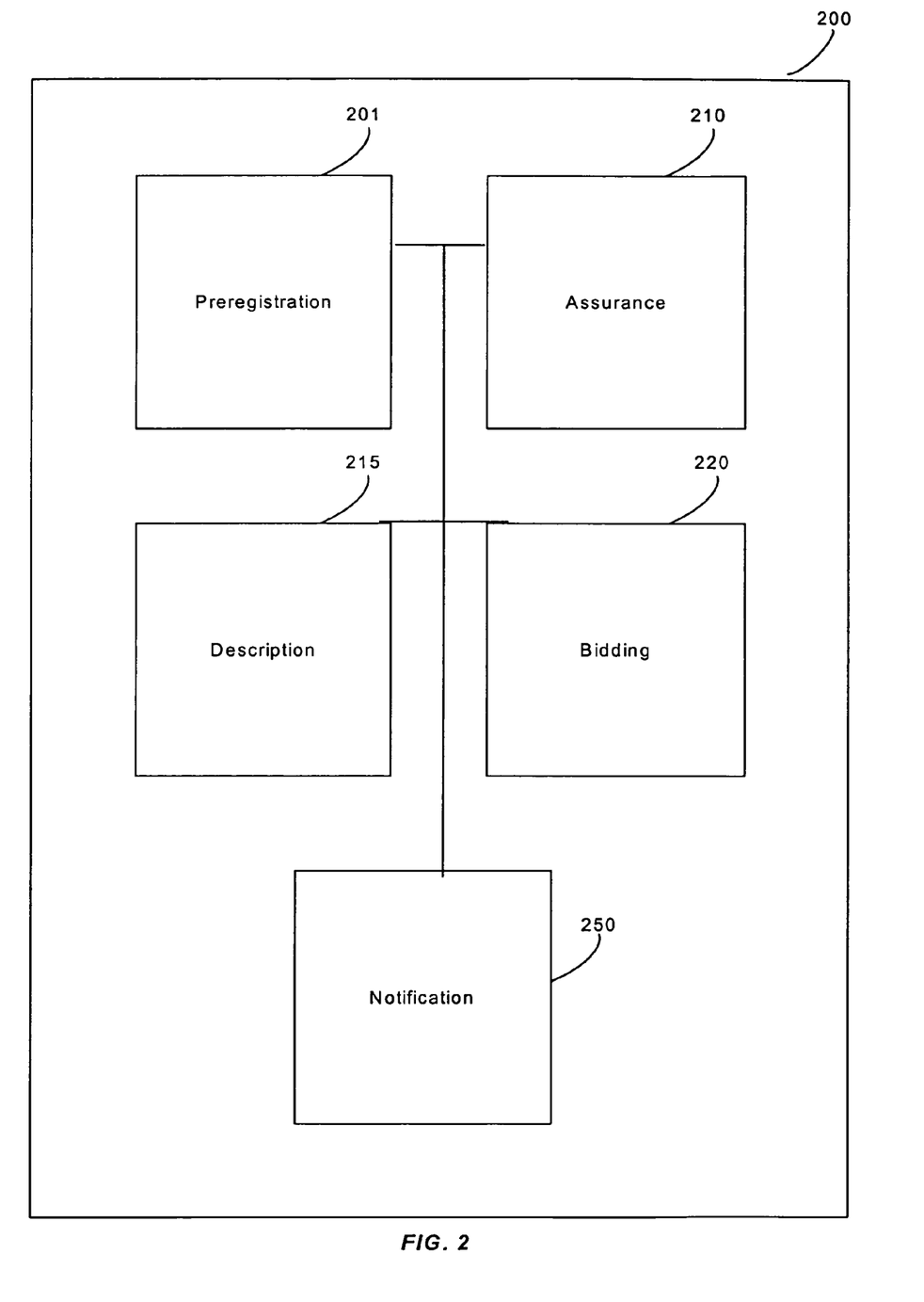
FIG. 2 is an illustration of a representative system in an embodiment according to the present invention.

FIG. 2 is one embodiment of an auction system 200 according to the present invention. This diagram is merely an illustration and should not limit the scope of the claims herein. One of ordinary skill in the art will recognize other variations, modifications, and alternatives.

The auction system 200 for a merchandise item comprises various coupled modules in communication with one another and the system databases, similar to databases 153 and 161 described with respect to FIG. 1. The merchandise item for auction is preferably a heavy equipment item. Suitable heavy equipment items include, but are not limited to, asphalt equipment, agricultural equipment, a compactor, a crane, a dozer, an excavator, a grader, a lift, a loader, logging equipment, an off-road truck, an on-road truck, paving equipment, power generating equipment, a scraper, a skidder, a trailer, a trencher, and the like. A preregistration module 201 is coupled to the server, similar to the server 140 described with respect to FIG. 1, for identifying and verifying a user of the auction system. The preregistration module checks the credit history of the user and generates a registration record of the user. The preregistration module is a gatekeeper to a user's bidding qualification.

An assurance module 210 is coupled to the preregistration module for conducting a presale inspection of the merchandise item and generates a merchandise inspection report. In preferred aspects, the merchandise inspection report includes a warranty, as an assurance to the buyer. The description module 215 is coupled to the assurance module for displaying the merchandise inspection report and a description report of the merchandise item. The description report can include a multimedia report of the merchandise item. Such multimedia items include, but are not limited to, text, an image, a video, an audio clip, streaming video and combinations thereof. In other aspects, the merchandise description and inspection report include merchandise video, merchandise audio, a 3-D virtual merchandise model, a virtual merchandise test drive, merchandise oil analysis, merchandise exhaust analysis and combinations of the foregoing.

A bidding module 220 is coupled to the description module for processing a plurality of bids from a plurality of users, wherein the bidding module analyzes each of the plurality of bids from each of the plurality of users to determine whether an incoming bid is higher or lower than a current high bid and to determine a current high bid. As described above, a system database, similar to databases 153 and 161 described with respect to FIG. 1, is coupled to the server (like the server in FIG. 1) for storing each of the plurality of bids from each of the plurality of users. The merchandise inspection report, the description report and the registration report are also stored in the database.

The system further includes a notification module 250 that is coupled to the system database for assigning each of the plurality of bids with each of the plurality of users and to notify each of the plurality of users whether their bid is successful. The user can be notified using a transmission such as facsimile, telephone, electronic mail or wireless communication.

Figure 3:
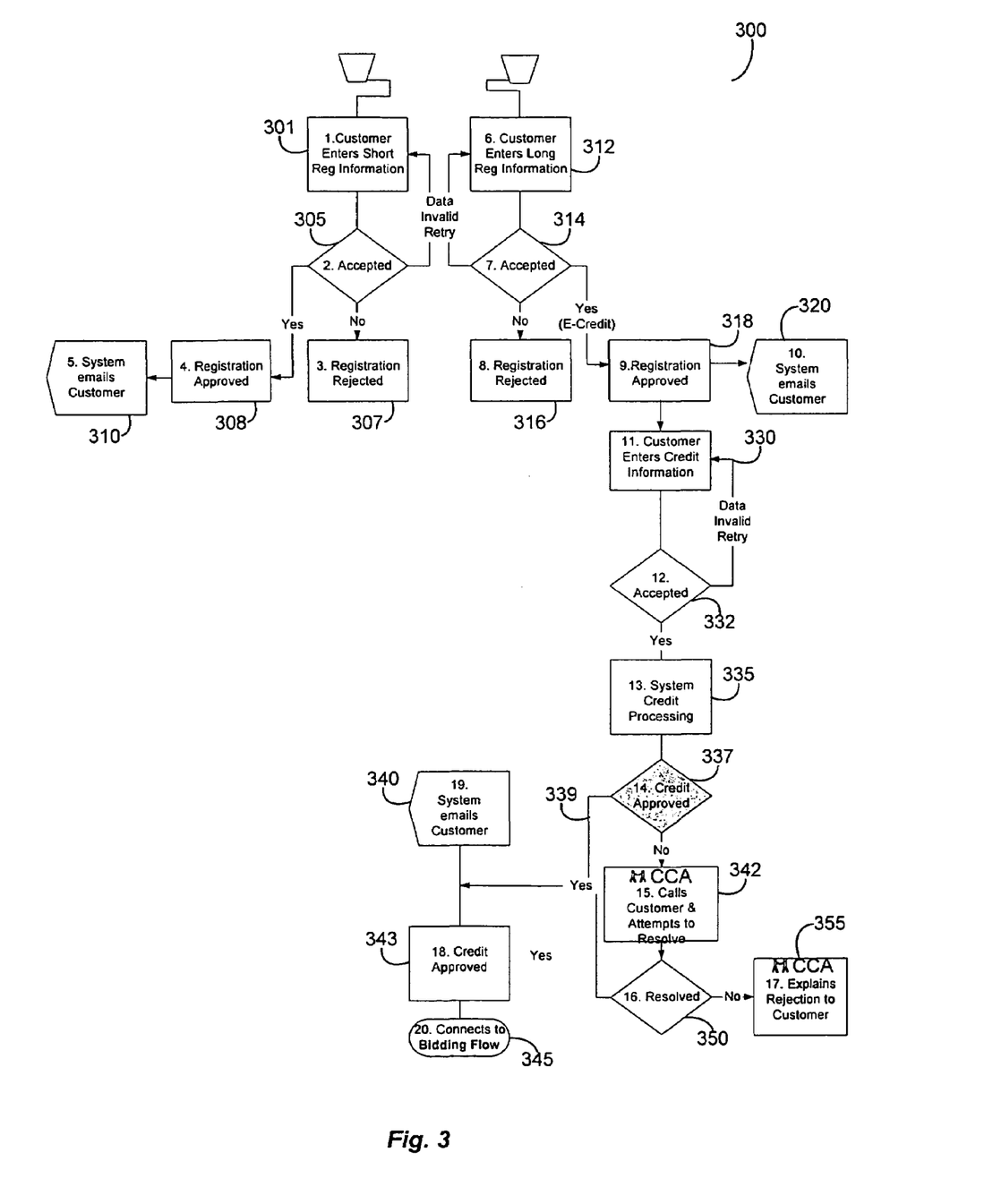
FIG. 3 is an illustration of a representative system module in an embodiment according to the present invention.

FIG. 3 is one embodiment of a flow diagram 300 of the registration module according to the present invention. This diagram is merely an illustration and should not limit the scope of the claims herein. One of ordinary skill in the art will recognize other variations, modifications, and alternatives.

A customer, using a browser, enters the short registration form. The following user actions will prompt a user to complete a registration form before going forward. The customer can choose a "Creating a Needs List" or "Creating a My Interested List" or the like. After completion of the short registration form, the decision as to whether to accept the customer or not is made. After completion of the registration form, the system module can prompt the customer to request free e-mail or other options. The registration module also assigns an account number for each user that is optionally displayed to the user.

At 305, the module will either accept or reject the registration. The registration may be rejected 307 for a number of reasons such as e-mail address is not valid, e-mail address is not unique, password and re-typed password are not equal, and the like. If rejected, the user can re-enter the information, e.g., up to 3 times. The system module will prompt the user with why the registration was rejected each time (e.g., invalid e-mail).

Alternatively, the registration is approved 308. The user has thus entered the data correctly and when the user registers in full later, the e-mail and password can be autofilled. The pre-registration module e-mails the customer 310 upon registration approval.

In an alternative embodiment, the customer can register via the long registration form 312. The long registration form allows additional functionality access such as bidding from detailed equipment listing, listing an equipment for sale, requesting an equipment locator, as well as providing e-mail for those who would like it.

The registration module includes additional features such as, broker programs such that the brokers can be compensated based upon total sale volume. In this aspect, the module will track the broker codes for each user that enters a broker code and then each time a user bids and wins, the database collects the auction information (total purchase price, time of auction, equipment ID#, number of bids, and the like) under the broker code of the registered user. Generally, the registered user is only associated with a broker code when the user bids and wins a piece of equipment. In certain aspects, after this initial purchase, the broker is associated with the buyer for a whole year from the time of the first purchase. The module assigns an account number for each user.

If the long registration is entered 312 the module decides whether to accept or reject the user 314. Rejecting 316 the registration could be the result of insufficient information provided (e.g., required fields not provided), incorrect information provided (e.g., typos or miscellaneous spaces), user banned due to prior violations of terms and policy, insufficient credit, fraud history, and the like. If rejected 316, the user can continue to retry, for example, with no limit. If the registration module approves 318 the user, additional access of the system is allowed. The registration system module will notify the user upon registration approval (e.g., e-mail 320 or the like).

The customer will then enter credit information into a webpage 330. If the user or customer wants to bid, the user submits additional credit information. The system checks for incorrect or insufficient information and allows the user to retry invalid data (e.g., typos, not enough digits in the social security number, and the like). In certain aspects, the system module will e-mail the user that additional credit information has been received if the user faxes or mails credit forms or information. In certain aspects, when the user retries due to error, the module autofills all the entered information the user entered previously, only leaving blank parts of the form that are identified as filled in inaccurately.

Thereafter, the module processes the user's credit information 335. The module makes a decision at step 337 as to whether credit is approved. In certain aspects, until the user's credit is approved, the user cannot bid. Various parameters are considered for credit approval. After credit is approved at step 339, the user is elevated to a higher level 343 and can start bidding. The system module e-mails the customer at step 340 upon credit approval. The user is thereafter connected to the bidding flow at step 345.

If credit is not approved, i.e., rejected the customer service calls 342 the user to explain the situation and collect more data to resolve 350 the credit problem. The customer service obtains the necessary credit information and clarifies any outstanding issues. Furthermore, the customer service personnel may collect additional information. If credit cannot be resolved, the customer service explains the rejection to the customer 355 (e.g., insufficient credit).

Figure 4:
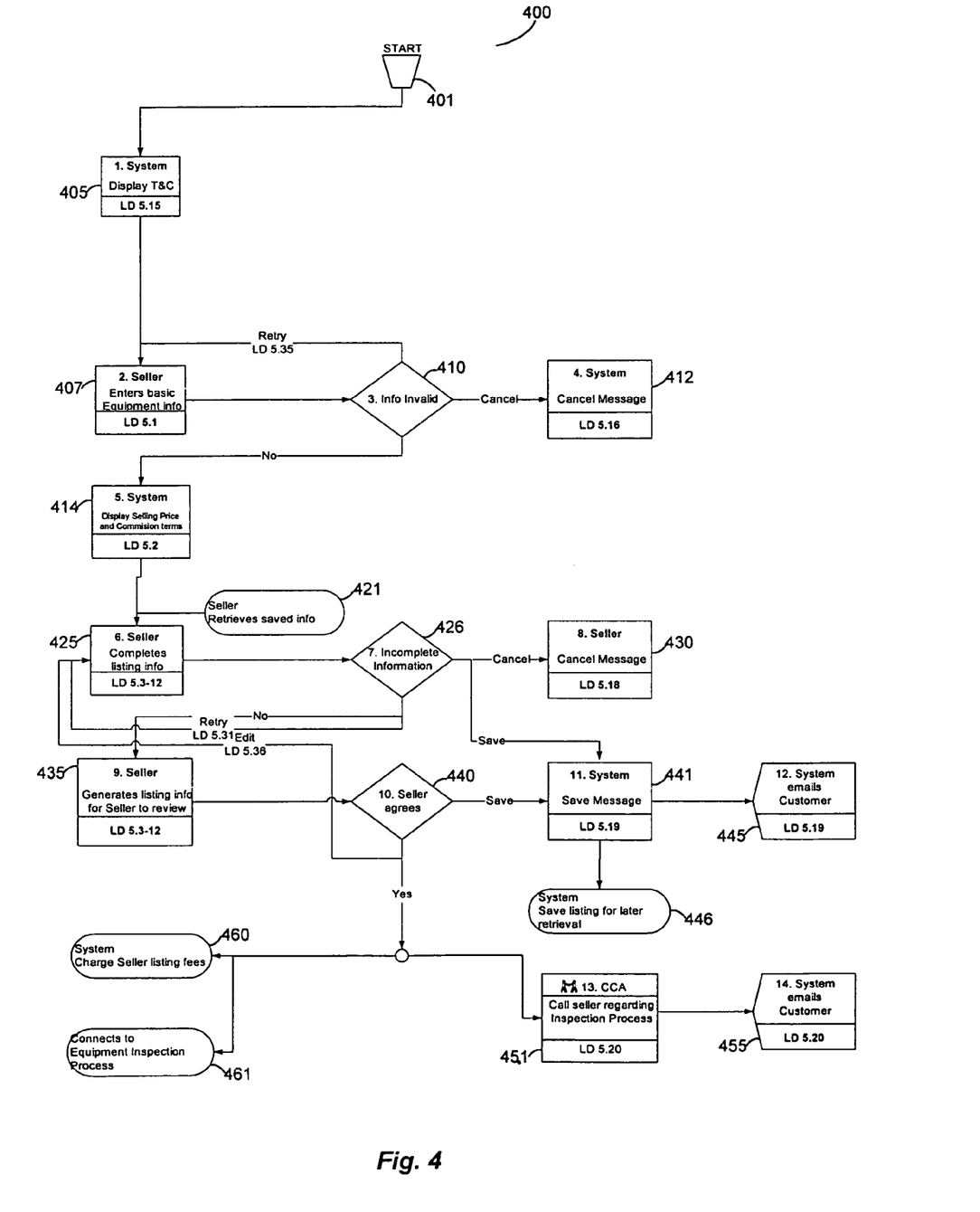
FIG. 4 is an illustration of a representative system module in an embodiment according to the present invention.

FIG. 4 is one embodiment of a flow diagram 400 of the description module according to the present invention. This diagram is merely an illustration and should not limit the scope of the claims herein. One of ordinary skill in the art will recognize other variations, modifications, and alternatives.

The description module 400 of the present system displays the merchandise inspection report and a description report of the merchandise item. The module starts at 401, wherein the system displays the terms and conditions 405 of the listing equipment. In one embodiment, the majority of this information is entered into the system by the seller. The seller enters basic information 407 such as for example, make, model, year of manufacture, serial number, and the like, of the merchandise item to be listed at auction. In certain aspects, if the information entered by the user is invalid, then the user has various options: the user can edit the information or cancel 412. The system will display a message to the seller indicating the reason for not listing and exit the user from the system.

Alternatively, the system module 414 will compute the average selling price (ASP) of the equipment based on make, model, and year of manufacture. This information can be displayed on the screen along with a commission schedule. In certain aspects, the system module allows the seller to complete other listing information about the equipment 425.

Thereafter, the system module verifies 426 if the information given by the user is incomplete or not, and gives the user various options. For example, if the information is incomplete, the user can retry to complete the "necessary" (appropriately highlighted) fields. Alternatively, if the information is incomplete, the user can just cancel 430 the entire transaction. Moreover, the user can save the information entered for later retrieval 441. However, if the information is complete, the seller is taken to the next display 435.

The system description module displays 435 the entire listing for the seller to review. At 440, the seller is queried as to whether the information is correct and is given various options. The seller can edit the information, the seller can save the listing for later retrieval 446, or the seller can agree to list. In certain aspects, if the seller does not choose to list, the system saves the listing under the "My Selling List" of the user (seller) with the status "Not Listed". In certain aspects, the system sends the user a message that the listing has been saved 445.

In certain preferred embodiments, after listing, customer service contacts the seller about the inspection process. Thereafter, the system module sends an email message to the user that the listing has been accepted and the inspection process will commence 455. In certain aspects, the system saves the listing under the "My Selling List" of the user with the "To Be Inspected" status. The system module connects to the equipment inspection process at step 461. The system module has the ability to charge the seller for the listing 460.

Figure 5:
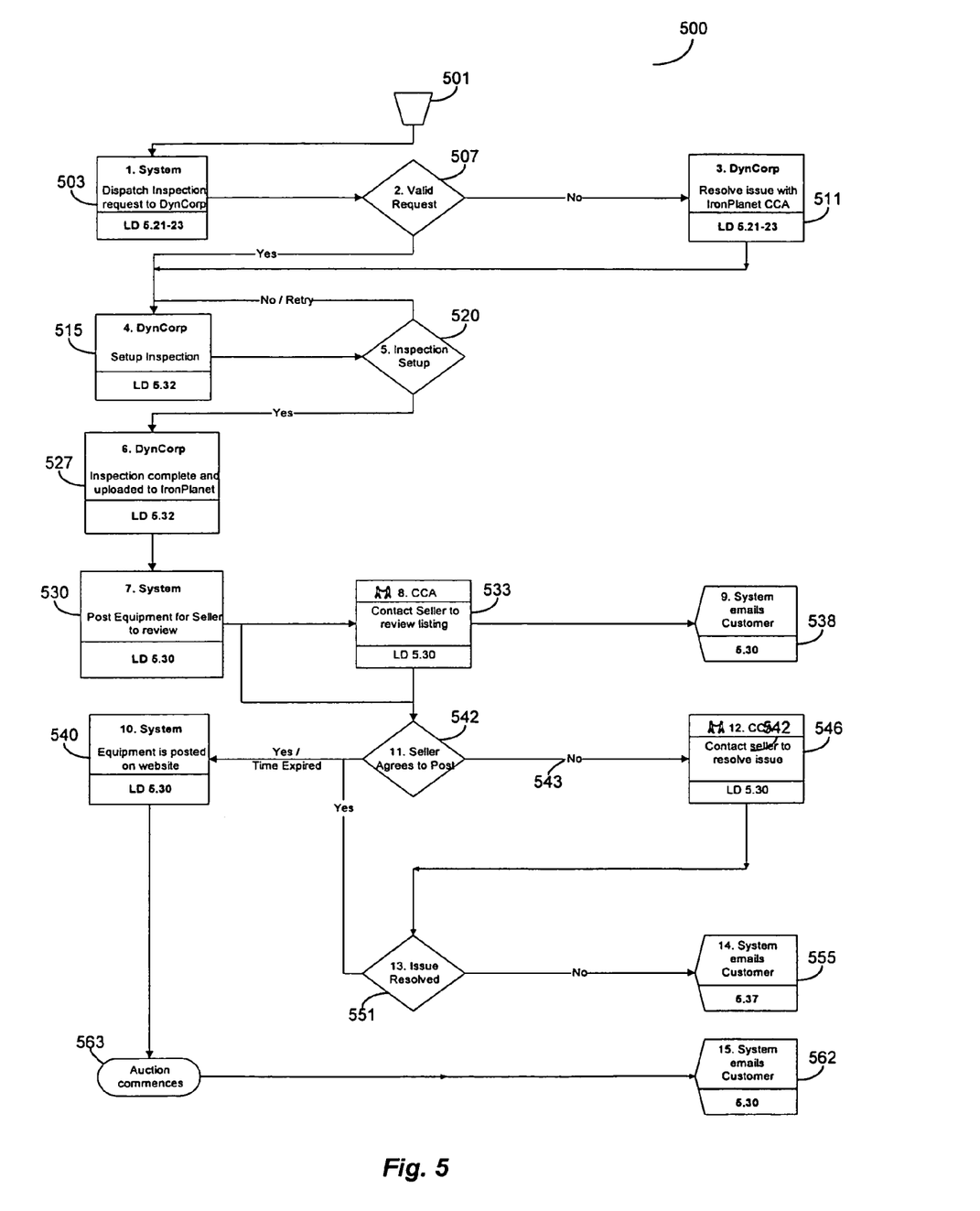
FIG. 5 is an illustration of a representative system module in an embodiment according to the present invention.

The system of the present invention comprises an assurance module for conducting a presale inspection of the merchandise item and to generate a merchandise inspection report. In a preferred embodiment, the inspection report is conducted by an impartial third party. FIG. 5 is one embodiment of a flow diagram 500 of the assurance module according to the present invention. This diagram is merely an illustration and should not limit the scope of the claims herein. One of ordinary skill in the art will recognize other variations, modifications, and alternatives.

The assurance module sends an inspection request alert 503, which links the seller and equipment information to the third party inspector. The module determines whether it is a valid or invalid request 507. If there is a problem with the inspection request, the inspector contacts the system administrator to resolve the issue 511. Thereafter, the third party inspector will setup the inspection 515. To maintain impartiality, the third party inspector contacts the seller 520. If the seller is not available, in certain aspects the third party inspector retries at periodic intervals with the seller or seller contact person. Thereafter, the inspection is conducted, and a third party inspector updates the inspection status for the merchandise item. Once the inspection is complete 527, the third party inspector will upload the completed inspection report into a database, similar to databases 153 and 161 described with respect to FIG. 1.

The equipment inspection report 530 is posted on a password-protect area of the website for the seller to preview. The seller is contacted 533 by the customer service to notify the posting and the terms and condition of preview process. In certain aspects, if the seller cannot be contacted, the equipment is posted on the website within 24 hours of seller preview period. Alternatively, the seller can check the website after the completion of the inspection. In preferred aspects, the assurance module sends an email 538 to the seller that the equipment is posted on the website and explaining the terms and conditions of the preview process.

The system assurance module determines whether the seller agrees or disagrees to post the listing 542. If the seller agrees to post 540, the equipment is posted on the website for all to see and the auction commences 563. However, if the seller does not agree to the posting 543 during the preview time window, the customer service contacts the seller 546 to resolve the issue. If the issue is resolved within the preview time window, the system goes to step 540 and the auction commences 563. If the issue is not resolved, the system sends an email 555 to the seller that the equipment will not be posted. Whenever the equipment status changes, during the listing and inspection process, the system sends an e-mail to the seller 562.

A user customer can search the loaded database, similar to databases 153 and 161 described with respect to FIG. 1, for suitable merchandise item in various ways. For example, the user can search by category. Alternatively, the user can search by keyword, wherein the user can start a keyword search from pages designated by logical displays. Other searching features include, but are not limited to, searching "My Needs List", and beyond the system database and searching other equipment databases connected to the network.

Figure 6:
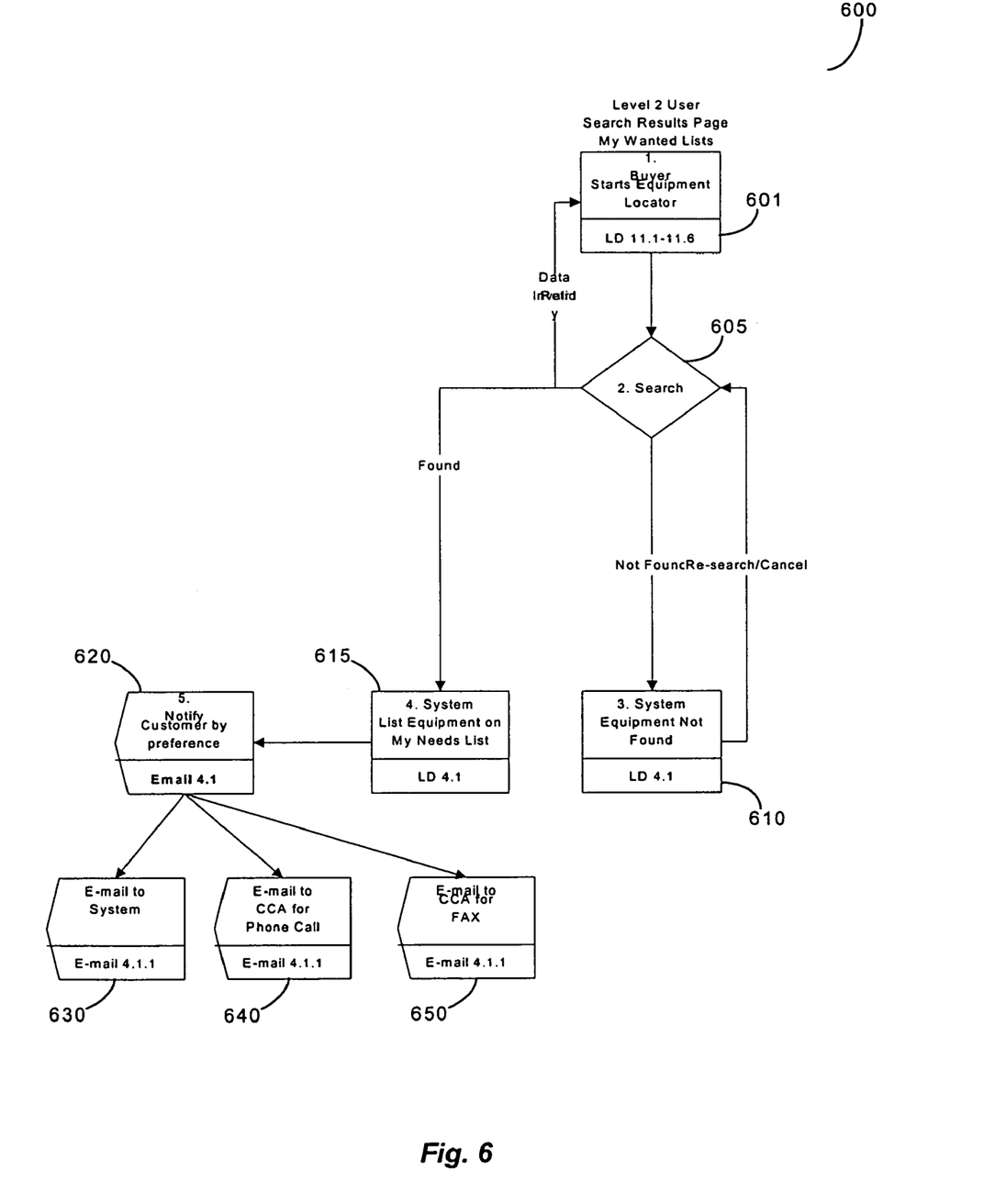
FIG. 6 is an illustration of a representative system module in an embodiment according to the present invention.

The certain preferred aspects, the description module comprises a equipment locator submodule. FIG. 6 is one embodiment of a flow diagram 600 of the equipment locator submodule according to the present invention. This diagram is merely an illustration and should not limit the scope of the claims herein. One of ordinary skill in the art will recognize other variations, modifications, and alternatives.

In certain instances, the equipment locator module is available when search results of the existing database, similar to databases 153 and 161 described with respect to FIG. 1, either turn up with no matches or the user wants to expand his search outside of the equipment database. The equipment locator is optionally available to the user to use after a search of the existing database is completed.

The user starts the equipment locator module 601 and the module 600 has the ability to autofill the search parameters based upon the fields the user specified in the initial advanced search, keyword search, My Needs List search, and the like. The module searches 605 the databases and the user can be asked to redo search if information is not correct (i.e. make and model are not a real match) in the search parameters. The module searches outside databases and sends an e-mail to all registered users with a description of the equipment being looked for based upon the information given. The module searches databases continuously for new equipment being posted on the present system. The module will keep on searching and collecting all found equipment until user turns off the module locator.

In certain instances, when the locator module is initiated, the item being searched for by the locator is place on the "My Needs List". In a preferred aspect, the "My Needs List" will display all the equipment locators currently initiated. If the search is unsuccessful, i.e., merchandise item is not found 610, the user can either cancel or continue the search or redefine the search. If the user re-defines the search (e.g., provides more information or changes previous information), the module will autofill search parameters based on search parameters set in previous search.

Upon a successful search, the module has found a merchandise item 615 and the item is listed on "My Needs List". As both found and currently being looked for, but not found equipment is being searched, the system does not stop searching unless a user turns it off. Thereafter, the module notifies the customer 620 by the customer's pre-selected preference. Depending on what the user indicated in terms of notification preferences (e-mail 630, fax 650, phone 640, wireless page, and the like) the system will contact the user about new equipment being found. In certain aspects, the system notifies the user only when a new additional piece equipment is found and does not keep notifying the user of the same piece of equipment.

In certain aspects, after completing a browse by category, keyword search and advanced search, the user can view the results. The equipment in the search results page can be moved to "My Needs List" for saving search results.

Figure 7:
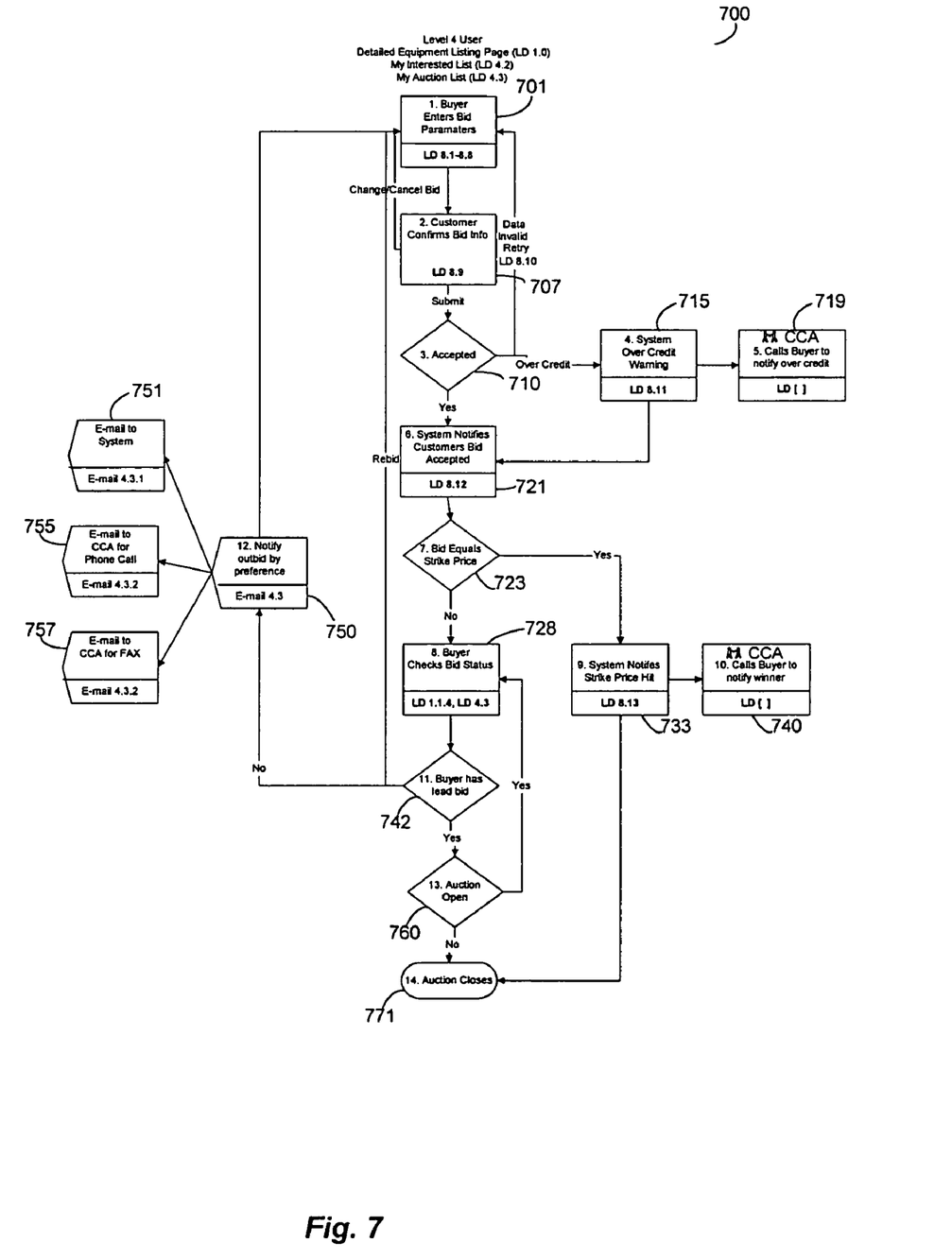
FIG. 7 is an illustration of a representative system module in an embodiment according to the present invention.

The system additionally comprises a bidding module for processing a plurality of bids from a plurality of users, wherein the bidding module analyzes each of the plurality of bids from each of the plurality of users to determine whether an incoming bid is higher or lower than a current high bid and to determine a current high bid. FIG. 7 is one embodiment of a flow diagram 700 of the bidding module according to the present invention. This diagram is merely an illustration and should not limit the scope of the claims herein. One of ordinary skill in the art will recognize other variations, modifications, and alternatives.

Buyers can access bidding capabilities from a variety of webpages. From these locations, the buyer will be prompted to the same bidding page. The buyer enters a bid 701. The bidding module allows for various bidding modalities. In one aspect, the buyer automatically sets the maximum bid price and the system proxy bids up to that maximum bid point. In another aspect, the buyer enters bids manually by repeatedly submitting bids. Customers can place bids before the auction officially begins if the equipment is posted on the website as a preview item. Preview items are inspected items that are inspected and posted, but awaiting for the official auction period to begin.

After the bid is entered, the customer confirms the bid information 707. This allows the user a chance to double-check bidding price before actually submitting the bid. Preferably, after the user submits bidding information, the screen refreshes with the user's bid all hard coded into the screen. Preferably, these values cannot be changed. At this point, the user can either return to the previous step to change the bid or hit the bid button to place bid, or the user can cancel bidding.

The bidding module checks 710 bid submission for invalid data entry such as wrong increment, bid lower than or equal to current bid, typos, missing information, and the like. The system prompts the user to re-enter information again with suggestions for what information is incorrect (bidder can re-try bid). Moreover, the bidding module decides whether the bid submitted by buyer is within credit limit. The module will notify the buyer that they are over their credit 719. Thereafter, the system will allow the buyer to apply for more credit. Customer service will contact the buyer 719 and notify them if their credit limit is changed/not changed after additional information is submitted.

The module determines whether an incoming bid is higher or lower than a current high bid and thereafter determines a current high bid 723. The bidding module notifies the customer that his bid was accepted 733. For example, if the bid submitted hits the strike price, the module will immediately close the auction 771. The customer service representative calls the buyer to notify winner 740 and thereafter calls the seller. Thus, both the buyer and seller are notified of the winning status, and thereafter begin any post-sales and ancillary services.

Alternatively, if the strike price is not hit 728, and the buyer does not have a lead bid 749, buyer can rebid or not bid (during the auction, the buyer can check the bid status). The module informs the user 750 that the user has been outbid (depending on what the buyer indicated in terms of notification preferences e.g., e-mail, fax, phone, and the like). If the auction is open 760, any higher level user can bid and continually check the bid status. If the auction closes 771 at the pre-determined auction end time, then no more bids are allowed.

Figure 8:
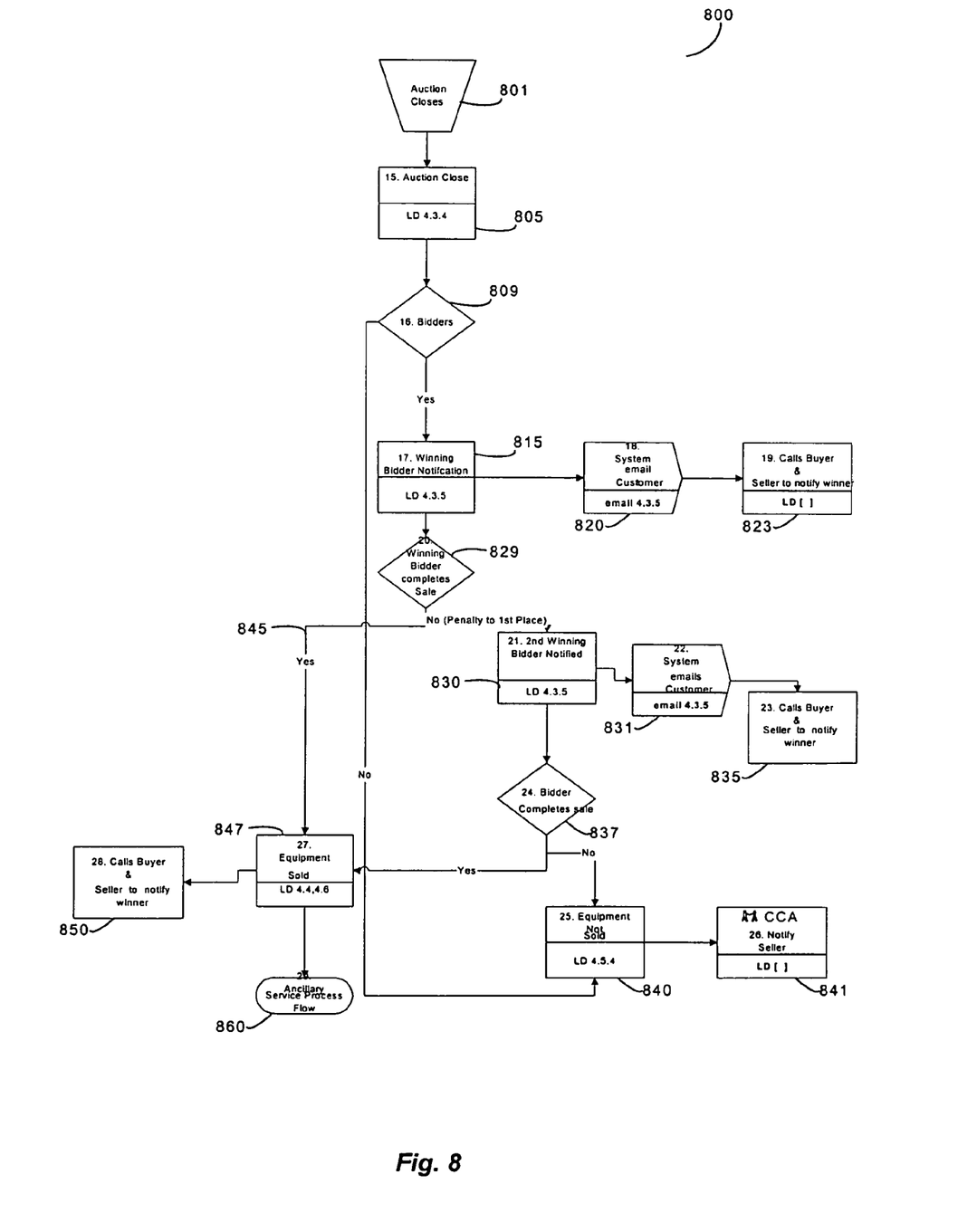
FIG. 8 is an illustration of a representative system module in an embodiment according to the present invention.

In preferred embodiments, the bidding module closes the auction 771 when the predetermined end time is reached, or the strike price is reached. The module will notify the plurality of users that the auction is over. The wining bidder is automatically named the winning bidder at step 809 (FIG. 8). In one embodiment, there is no reserve price for the merchandise and only a minimum bid is set. Thus, if the highest bid at least equals the minimum bid, the equipment will sell and the bidder is the winner.

The module will query the highest bidder to determine the winning bid price 809. The winning bidder is notified 815 and the losing bidder(s) are notified. The buyer is e-mailed 820 that the reserve price is met and the buyer is the winning bidder. The customer service calls 823 the buyer and seller to notify winning status, and to begin any post-sales and ancillary services.

If the winning bidder completes the transaction by submitting funds within for example, 2 business days 845, the equipment is sold to the bidder. At 847, the equipment is sold. The customer service calls 850 the buyers and seller to notify the winner and the ancillary services commences 860.

If, however, the winning bidder fails to complete the sale such as by not contacting the system within for example, two business days after close of auction, because of bidder error, or the bidder cannot financially complete the transaction, the second winning bidder is notified 830 and will be declared the new winning bidder after the auction close. In one embodiment, penalties are imposed on the first winner if the winner does not complete the sale. The penalties are for example, that a bidders that fails to complete the sale loses all registration privileges. Moreover, the bidders that fail to complete the sale lose their winning bid deposit.

The customer service calls 835 the second winner bidder to tell them that the first winning bidder defaulted and the system 831 automatically generates an e-mail to the potential winning bidder.

The system and method of the present invention provides a variety of ancillary services of both the pre-sale and post-sale varieties. For example, the system and method provides a shipping calculator to allow the user to utilize a transportation calculator service. The ship-to zip code field can be entered to estimate the price of the service. In other aspects, a loan calculator allows the user to utilize a loan calculator service to estimate monthly payments and cost of financing the merchandise item.

While the invention has been described with reference to certain illustrated embodiments this description is not intended to be construed in a limiting sense. For example, the computer platform used to implement the above embodiments include Intel Pentium class based computers, Power PC based computers, Digital ALPHA based computers, Sun-Microsystems SPARC computers, etc.; computer operating systems may include WINDOWS NT, DOS, MacOs, UNIX, VMS, etc.; programming languages may include C, C++, Pascal, an object-oriented language, etc. Various modifications of the illustrated embodiments as well as other embodiments of the invention will become apparent to those persons skilled in the art upon reference to this description. In addition, a number of the above processes can be separated or combined into hardware, software, or both and the various embodiments described should not be limiting. It will be understood, therefore that the invention is defined not by the above description, but by the appended claims.

What is claimed is:

1. An auction system for a merchandise item in a networked environment, said networked environment comprising at least one client connected to at least one server by a network, said auction system comprising:

a preregistration module coupled to said at least one server for identifying and verifying a user of said auction system wherein said preregistration module checks the credit history of said user and generates a registration record of said user;

an assurance module coupled to said preregistration module for conducting a presale inspection of said merchandise item and to generate a merchandise inspection report, the merchandise inspection report being conducted by an impartial third party, the merchandise inspection report including a warranty for the merchandise inspection report as an assurance to the buyer;

a description module coupled to said assurance module for displaying said merchandise inspection report and a description report of said merchandise item;

a bidding module coupled to said description module for processing a plurality of bids from a plurality of users, the plurality of users including a buyer for the merchandise item, the buyer is free from providing any condition associated with the merchandise item, wherein said bidding module analyzes each of said plurality of bids from each of said plurality of users to determine whether an incoming bid is higher or lower than a current high bid and to determine a current high bid;

a system database coupled to said at least one server for storing each of said plurality of bids from each of said plurality of users, said merchandise inspection report, said description report and said registration record;

a notification module coupled to said system database for assigning each of said plurality of bids with each of said plurality of users and to notify each of said plurality of users whether their bid is successful;

wherein said merchandise inspection report is displayed prior to said processing a plurality of bids from a plurality of users;

wherein said auction system removes said merchandise item from said auction system if a seller of said merchandise item does not agree with said merchandise inspection report generated by said assurance module.

2. The auction system according to claim 1, wherein said merchandise item is a heavy equipment item.

3. The auction system according to claim 1, wherein said preregistration module is a gatekeeper to a user's bidding qualification.

4. The auction system according to claim 1, wherein said description report includes multimedia descriptive content of said merchandise item.

5. The auction system according to claim 4, wherein said description report include a member selected from the group consisting of text, an image, a video, an audio clip, streaming video and combinations thereof.

6. The auction system according to claim 1, further comprising a merchandise locator module coupled to said description module to enable said user to search said system database.

7. The auction system according to claim 1, wherein said notification module notifies said user using a transmission selected from the group consisting of facsimile, telephone, electronic mail or wireless communication.

8. The auction system according to claim 1, wherein said networked environment is selected from the group consisting of a worldwide computer network, the Internet, a wide area network, a local area network, and an intranet.

9. The auction system according to claim 1, wherein said bidding module is configured to accept said incoming bid manually.

10. The auction system according to claim 1, wherein said bidding module is configured to accept said incoming bid by proxy.

11. The auction system according to claim 1, wherein said merchandise inspection report includes a member selected from the group consisting of merchandise video, merchandise audio, a 3-D virtual merchandise model, a virtual merchandise test drive, merchandise oil analysis, merchandise exhaust analysis and combinations thereof.

12. The auction system according to claim 2, wherein said heavy equipment item is selected from the group consisting of asphalt equipment, agricultural equipment, a compactor, a crane, a dozer, an excavator, a grader, a lift, a loader, logging equipment, an off-road truck, an on-road truck, paving equipment, power generating equipment, a scraper, a skidder, a trailer and a trencher.

13. A method for auctioning a merchandise item in a networked environment, said networked environment comprising at least one client connected to at least one server by a network, said method comprising:
  inputting preregistration material from said at least one client into a system database to generate a registration record of a first user;
  inspecting said merchandise item by a third party, to generate a merchandise presale inspection report of said merchandise item, the merchandise inspection report including a warranty for the merchandise inspection report as an assurance to said buyer;
  removing said merchandise item from auctioning if said first user does not agree to said presale inspection report of said merchandise;
  describing said merchandise item to generate a description report of said merchandise item;
  browsing said inspection report and said description report to allow a second user to select said merchandise item and make a bid;
  processing a plurality of bids from a plurality of users, the plurality of users includes a buyer of said merchandise item, the buyer being free from providing any condition associated with said merchandise item, and analyzing each of said plurality of bids from each of said plurality of users to determine whether an incoming bid is higher or lower than a current high bid and to determine a current high bid;
  storing each of said plurality of bids from each of said plurality of users, said merchandise inspection report, said description report and said registration record in said system database;
  correlating each of said plurality of bids with each of said plurality of users and notifying each of said plurality of users whether their bid is successful, thereby auctioning said merchandise item in a networked environment;
  wherein said merchandise inspection report is displayed prior to said processing a plurality of bids from a plurality of users;
  wherein said merchandise inspection report is conducted by an impartial third party, said merchandise inspection report including a warranty for the merchandise inspection report as an assurance to said buyer.

14. The method for auctioning according to claim 13, wherein said merchandise item is a heavy equipment item.

15. The method for auctioning according to claim 13, wherein said registration record acts as gatekeeper to said first user's ability to bid.

16. The method for auctioning according to claim 13, wherein said description report includes streaming video of said merchandise item.

17. The method for auctioning according to claim 13, wherein said user is notified using a transmission selected from the group consisting of facsimile, telephone, electronic mail or wireless communication.

18. The method for auctioning according to claim 13, wherein said network is selected from the group consisting of a worldwide computer network, the Internet, a wide area network, a local area network, and an intranet.

19. The method for auctioning according to claim 13, wherein said bid is manually input by said second user.

20. The method for auctioning according to claim 13, wherein said bid is input by proxy.

21. The method for auctioning according to claim 13, wherein said merchandise inspection report includes a member selected from the group consisting of merchandise video, merchandise audio, a 3-D virtual merchandise model, a virtual merchandise test drive, merchandise oil analysis, merchandise exhaust analysis and combinations thereof.

22. The method for auctioning according to claim 14, wherein said heavy equipment item is selected from the group consisting of asphalt equipment, agricultural equipment, a compactor, a crane, a dozer, an excavator, a grader, a lift, a loader, logging equipment, an off-road truck, an on-road truck, paving equipment, power generating equipment, a scraper, a skidder, a trailer and a trencher.

23. The method for auctioning according to claim 13, wherein said current high bid after a period of time is declared the winner.

* * * * *